United States Patent

Kolagotla et al.

[11] Patent Number: 6,044,063
[45] Date of Patent: Mar. 28, 2000

[54] UNSIGNED INTEGER COMPARATOR

[75] Inventors: Ravi Kumar Kolagotla, Breinigsville; Santosh K. Misra, Allentown; Jiancheng Mo, Allentown; Hosahalli R. Srinivas, Allentown, all of Pa.

[73] Assignee: Lucent Technologies, Inc., Murray Hill, N.J.

[21] Appl. No.: 08/976,395

[22] Filed: Nov. 21, 1997

[51] Int. Cl.[7] .................................................. H04L 29/00
[52] U.S. Cl. ...................................... 370/241; 340/146.2
[58] Field of Search ................................... 370/522, 252, 370/241; 371/67.1, 68.1; 340/146.2; 341/164, 165; 382/218

[56] References Cited

U.S. PATENT DOCUMENTS 3,938,087  2/1976  Louie ..................................... 340/146.2
5,167,033  11/1992 Bryant et al. ............................ 395/575
5,220,306  6/1993  Shimizu ................................. 340/146.2
5,764,548  6/1998  Keith et al. .......................... 364/715.03

*Primary Examiner*—Huy D. Vu
*Assistant Examiner*—Dung Trinh

[57] ABSTRACT

An unsigned integer comparator for use when comparing an n-bit received signal (such as an address) with an n-bit known signal ("comparison address"). The first stage of the comparator may be configured in advance, since the values of both a "comparison signal" and a "select signal" are known a priori. When the "current signal" arrives, the bits of this signal are then compared against the associated bits of the comparison signal. Subsequent stages of the comparator perform comparison operations of increasing length, dependent upon the outcome of the previous stage (i.e., a first set of 2-bit comparisons, then 4-bit, 8-bit, etc.), until the entire n-bit integers are ultimately compared and a final output is generated.

19 Claims, 2 Drawing Sheets

UNSIGNED INTEGER COMPARATOR

BACKGROUND OF THE INVENTION

1. Field of the Invention

The present invention relates to an unsigned integer comparator and, more particularly, to an unsigned integer comparator useful in high speed data circuits.

2. Description of the Prior Art

In address arithmetic units, as well as address watchpoint units, it is important to know if the current address is "equal to" (E) or "greater than/equal to" (GE) to a specified address, where address values are always unsigned integers. In most data circuit arrangements, it is required that such comparison be completed in one clock cycle (or less). One prior art approach to performing this comparison, included in current digital signal processor designs, utilizes the carry chain of a fast n bit adder, where n is the word length of the address. The delay involved in this comparison process is determined by the n-bit carry propagation delay. Further, extra time is required to select between E and GE, as well as to pass the selected E or GE indication to the output decision step. An approach to reducing the delay associated with conventional comparators is to increase the processing speed of the "fast" n bit adder. However, processing technology limitations are foreseen to limit the additional speed that may be gained by this approach.

Therefore, a need remains in the art for an unsigned integer comparator that is capable of processing unsigned integers at the speeds required for next generation circuit designs.

SUMMARY OF THE INVENTION

The need remaining in the prior art is addressed by the present invention, which relates to an unsigned integer comparator and, more particularly, to an unsigned integer comparator useful in high speed data circuits.

In accordance with the teachings of the present invention, the a priori known "comparison" address (address B) and the select signal (either "equal" or "greater than/equal", denoted SGEB) are used to define in advance a set of control signals that are applied to parallel multiplexers, thereby controlling the flow of the "current" address (address A) through the set of parallel multiplexers. The number of parallel multiplexers used is a function of the number of bits to be compared. For example, comparison address B and current address A can be parsed into 2-bit segments, with a set of n/2 parallel multiplexers used. Alternatively, the addresses may be parsed into 4-bit segments and a set of n/4 parallel multiplexers used. The outputs from this initial set of parallel multiplexers are then passed through a simple binary logic tree to ultimately provide for the comparison of the entire n-bit length address A to comparison address B. Regardless of the number of parallel multiplexers, the comparator is effectively configured a priori to perform the comparison between current address A and comparison address B and generate the final output with minimal delay.

In one embodiment of the comparator of the present invention, a plurality of two-bit comparators are used to compare parsed segments of the current address A to associated two-bit segments of the comparison address B, each two-bit comparator generating a set of three outputs: "E" (A=B), "NE" (A≠B), and "GE" (A≧B) (for the purposes of this discussion, it will be assumed that the a priori value of SGEB is selected to determine if A≧B. Alternatively, the value of SGEB may be chosen to determine if A=B. The value of select signal SGEB is only a matter of design choice). Once these initial values have been determined, a pre-defined logic structure is used to determine the ultimate "comparison" of the entire n-bit address of B against the n-bit address of A by comparing, in stages, increasingly larger segments of address A against address B. In particular, the three outputs (E, NE, GE) from the initial 2-bit comparator stage are next applied as inputs to a "4-bit" stage of comparison, each 4-bit comparator receiving as inputs the "E, NE and GE" outputs from a pair of contiguous two-bit comparators (i.e. adjacent bit positions, a first comparator associated with the relative "least significant bits" and a second comparator associated with the relative "most significant bits"). Each of the subsequent comparators forming this binary logic tree performs the following three logic operations: (1) compares the received pair of "E" input signals and uses these values to generate the "NE" output for the next stage, (2) compares the received pair of "NE" values to generate the "E" output for the next stage, and (3) passes along the proper "GE" input as the "GE" output, based upon whether or not the most significant bits are equal. That is, the "GE" output will be the "GE" input related to the least significant bits if the most significant bits are equal, otherwise, the "GE" output will be the "GE" input related to the most significant bits. The comparison process continues until the entire n-bit length of A has been compared to the entire n-bit length of B.

In an alternative embodiment, a certain subset of the initial two-bit comparators may be replaced by a plurality of one-bit comparators. The use of these one-bit comparators results in reducing the overall size of the unsigned integer comparator.

The comparators of the logic structure may be formed to comprise a set of identical components (a NAND gate, NOR gate and a simple two-bit comparator). Alternatively, each comparator may be individually designed, since each stage of comparison will utilize different combinations of outputs from a previous stage. In general, the comparators are configured to use either pair of outputs: "GE" and "E", or "GE" and "NE". In another embodiment, all three may be used to increase the speed of the comparator structure.

The unsigned integer comparator of the present invention can be implemented in an integrated circuit and is useful in a microprocessor, microcontroller, or digital signal processor. The unsigned integer comparator may also be employed in a hardware debugging unit that monitors address busses.

BRIEF DESCRIPTION OF THE DRAWINGS

Referring now to the drawings, where like numerals represent like parts in several views.

DETAILED DESCRIPTION

In general, the premise of the architecture of the present invention is that certain data will be known a priori, namely, the comparison address B, as well as the precise selection criteria signal ("SGEB"). That is, the selection will be based on either A=B or A≧B. That being the case, the comparison logic can be developed beforehand, with the received bits of the current address A proceeding through the pre-defined logic circuit to obtain the desired result. The general philosophy of the present invention is to parse the current address A and the comparison address B into segments (for example, two-bit segments) such that parallel comparisons of the parsed segments are performed—the number of bits included in each parsed segment thus defining the complexity (or simplicity) of the overall comparator architecture. In the exemplary embodiment first described below, each address is parsed into two-bit segments and the comparison is performed simultaneously on two-bit pairs of addresses A and B. Once these comparisons are completed, a series of relatively simple comparators can be used to generate the final overall comparison signal Z. It is to be understood that the use of two bits in the initial parsing is exemplary only and in general any appropriate parsing (e.g., 4 bits, 8 bits) may be used.

Figure 1:
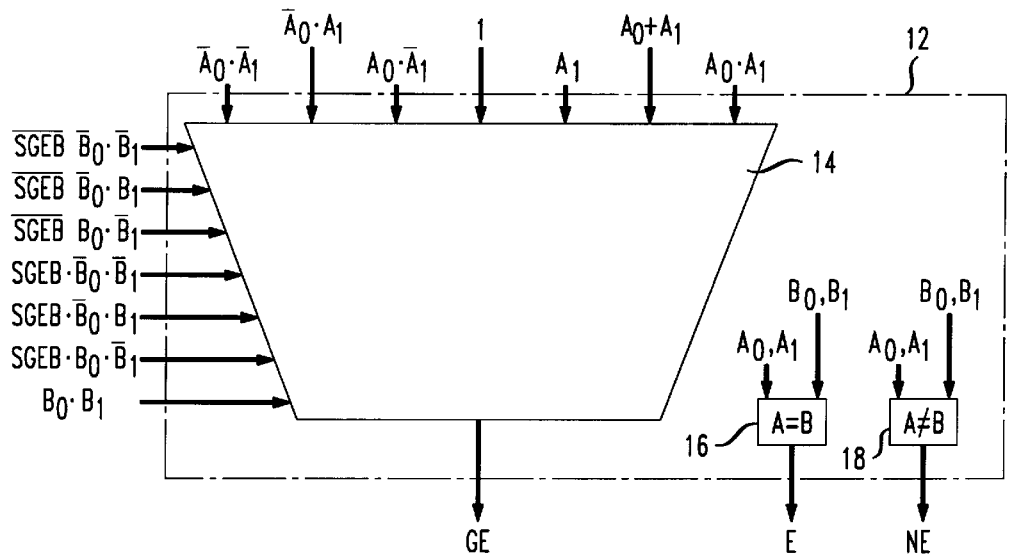
FIG. 1 illustrates an exemplary two bit comparator structure formed in accordance with the present invention, using the a priori values of comparison address B and select signal SGEB to establish the combinational logic required to form the E, NE and GE signals related to a two-bit segment of addresses A and B (e.g., $A_0, A_1$ and $B_0, B_1$)

An exemplary 2-bit comparator 12 that may be used to generate the required output signals "E", "NE", "GE" based upon the a priori signals B and SGEB, compared against a currently received address A, is illustrated in FIG. 1. For the purposes of discussion, only a single comparator 12 is illustrated. As will be described in detail below, the complete unsigned integer comparator will utilize a plurality of such devices, where each such device is configured to process two bits of addresses A and B. Comparator 12 includes a multiplexer 14 used to generate the GE output signal, an "equal to" circuit 16, used to generate the E output signal, and a "not equal to" circuit 18, used to generate the NE output signal.

As mentioned above, an advantage of the architecture of the present invention is that both comparison address B and select signal SGEB are known a priori. Therefore, the logic construct associated with multiplexer 14 is configured in advance and is "ready" to process current address A as soon as it arrives. That is, the various combinations of, for this particular example, bits $B_1$ and $B_0$ of comparison address B are combined with the value of SGEB (and its inverse) in the illustrated pre-set logic combinations. Thus, the only computations that need to occur in the critical path are the various combinations of $A_0$ and $A_1$. Referring to FIG. 1, the combination of signals SGEB, $B_0$, $B_1$ with current address bits $A_0$ and $A_1$ as processed through multiplexer 14 are thus utilized to form the "GE" output (associated with these particular bits of addresses A and B) for comparator 12.

Current address bits $(A_0,A_1)$ can easily be compared to comparison address bits $(B_0,B_1)$ to determine if they are "equal" (E) or "not equal" (NE), using a relatively straightforward "equal to" circuit 16 and "not equal to" circuit 18, respectively. As previously mentioned, only one of the comparisons "E" or "NE" is required to be performed. The remainder of the circuitry can function using the pair "GE" and "E", or the pair "GE" and "NE". However, all three may be generated, as shown in FIG. 1, and then used in subsequent stages.

EXAMPLE

Assume the following inputs to comparator 12:
SGEB=1, $(B_1,B_0)$=(1,0) and $(A_1,A_0)$=(1,1).
The associated control signal combination inputs to multiplexer 14, as well as the combinations of the bits forming A, would be as illustrated in FIG. 1.
The outputs from comparator 12 would therefore have the following values:
GE=1, E=0, NE=1.
That is, $(A_1,A_0) \geq (B_1,B_0)$ and $(A_1,A_0) \neq (B_1,B_0)$. As mentioned above, a plurality of such comparators 12 are required to process the entire n-bit addresses (in particular, n/2 such comparators when an initial two-bit parsing is used) and would be similarly constructed so as to provide the "GE, E and NE" outputs associated with the particular address bits applied as inputs thereto. It is to be understood that an initial four-bit parsing could have been used, or any other acceptable value, to form the initial sub-groupings.

Figure 2:
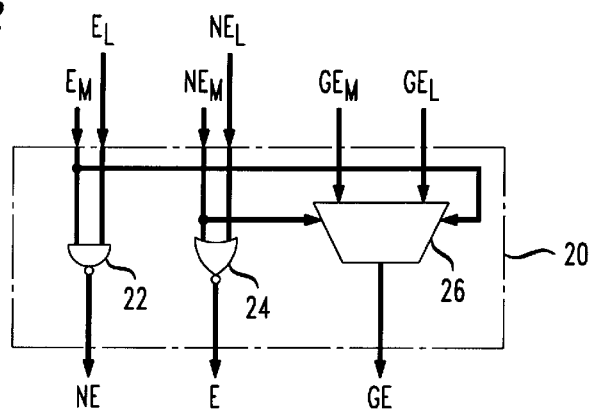
FIG. 2 contains a diagram of an exemplary comparator circuit utilized to generate the E, NE and GE output signals for each subsequent stage of the unsigned integer comparator as illustrated in FIG. 3.

Once these initial values of "E", "NE" and "GE" have been derived for each parsed section of the addresses, a relatively simple binary logic tree can be used to sequentially combine these outputs to form the overall output signals "E", "NE" and "GE" for the complete n-bit length addresses. An exemplary circuit 20 that may be utilized as a processor for the subsequent levels of the unsigned integer comparator is illustrated in FIG. 2. Circuit 20 is exemplary only; as long as the required logic functions are maintained, the same result can be achieved using other techniques known in the art.

The following discussion will describe the operation of exemplary comparator circuit 20, responsive to the "E, NE and GE" signals generated by a pair of comparators $12_1$ (the least significant bits, or "LSB" sub-section) and $12_2$ (the most significant bits, or "MSB" sub-section). This specific discussion is intended to be illustrative only, aiding in the understanding of the signal flow processing of the arrangement of the present invention. The same configuration as illustrated in FIG. 2 may be used to form each of the comparators illustrated in the architecture illustrated in FIG. 3 below. Alternatively, as will be discussed in detail hereinafter, a simplified architecture may be employed, where each comparator may include slightly different components.

For the purposes of the present discussion, it will be assumed that each comparator $20_i$ is identically formed. Referring to FIG. 2, the "E" inputs from comparators $12_2$ and $12_1$ are denoted $E_M$ and $E_L$, respectively; denoting their status as being associated with either the "MSB" (most significant bits) or the "LSB" (least significant bits) subsection of the address signals, respectively. Likewise, the NE and GE outputs from comparators $12_1$ and $12_2$ are similarly denoted. As shown in FIG. 2, "equal" signals $E_M$ and $E_L$ are applied as separate inputs to a NAND gate 22, where the output from NAND gate 22 thus forms the "NE" output of comparator circuit 20. Following through with the above example, it has already been determined that $E_L$=0. Therefore, regardless of whether $E_M$ is logic "0" or logic "1" value, the output from NAND gate 22 will be a logic "1", thus stating that the associated four bits of current address A (i.e., $A_3$–$A_0$) are "not equal" to the associated four bits from comparison address B (i.e., $B_3$–$B_0$). The NE input signals are similarly used to generate the "E" output from comparator circuit 20, where the NE signals are applied as separate inputs to a NOR gate 24 which then uses these inputs to generate the required "E" output. From the above example, $NE_L$=1. Therefore, regardless of whether $NE_M$ is logic "0"

or logic "1", the output from NOR gate 24 will be a logic "0", again indicating that the compared 4-bit subsections are not "equal".

The GE value passed to the next stage is a function of the values attributed to "E" and "NE". That is, if $E_M=1$ (meaning the MSB's of addresses A and B are equal), the GE value associated with the LSB's, $GE_L$, is passed through as the output. Otherwise, $GE_M$ is used. A simple multiplexer 26, controlled in this exemplary embodiment by $NE_M$, is capable of generating the desired output. Alternatively, $E_M$ (or both $E_M$ and $NE_M$) may be used to control the multiplexer. Using both $E_M$ and $NE_M$ is preferred. Referring back to FIG. 2, the GE values $GE_L$ and $GE_M$ are applied as separate inputs to multiplexer 26. When logic signal $NE_M=0$ (meaning, as above, that the MSB's of addresses A and B are equal), multiplexer 26 will provide signal $GE_L$ as the output. When logic signal $NE_M=1$ (meaning that the MSB's of addresses A and B are not equal), signal $GE_M$ will be used as the output signal GE from multiplexer 26.

The above-described configuration of a NAND gate, a NOR gate and a multiplexer as forming comparator circuit 20 may thus be used to form each of the comparators required for the complete unsigned integer comparator, where only the inputs to each of the various comparators will differ. The ability to utilize identical logic modules at each comparator stage of the inventive unsigned integer comparator is considered to be a processing advantage in terms of forming the actual integrated circuit device. It is to be understood that since associated "NE" and "E" values will always be complementary, the circuitry may be simplified, as desired, so that only one of the values in generated; the complement can always be formed by inversion, if desired.

Figure 3:
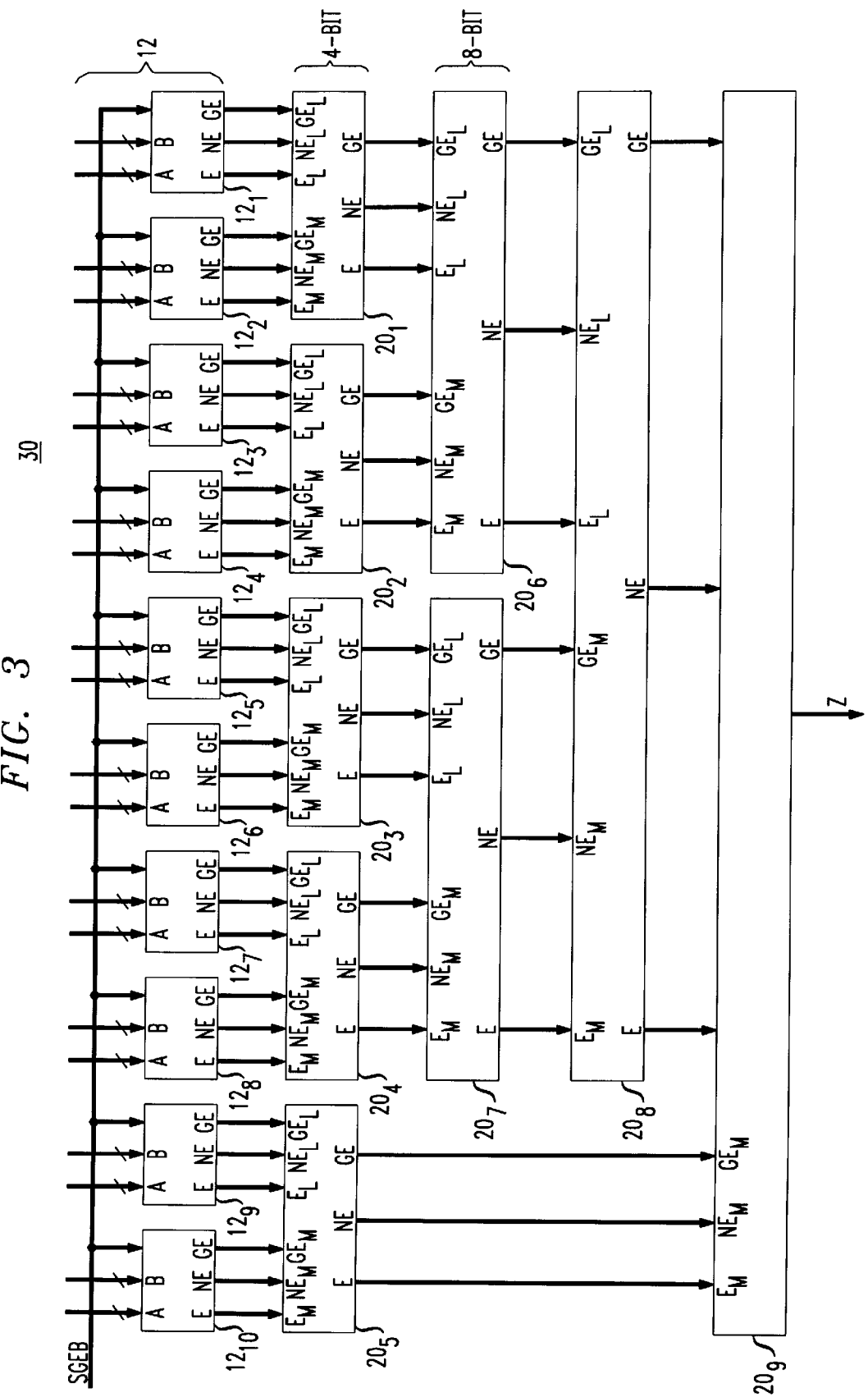
FIG. 3 contains a diagram of the overall architecture of an exemplary unsigned integer comparator formed in accordance with the teachings of the present invention, the comparator formed utilizing a plurality of two-bit comparators (FIG. 1) and a plurality of comparator circuits (FIG. 2)

FIG. 3 contains a diagram of the overall architecture of an unsigned integer comparator 30 formed in accordance with the present invention. For the purposes of discussion, comparator 30 will be described as implementing the comparison of two address values. It is to be understood, however, that the architecture of the present invention is not limited to the comparison of addresses, and may be used in any circumstance where it is necessary to compare unsigned integers. Additionally, the diagram illustrates an architecture suitable for comparing two 20-bit length unsigned integers. It is to be understood that the same design philosophy can be used to construct an n-bit comparator, where n is any pre-defined number. Referring to FIG. 3, comparator 30 includes a set of ten two-bit comparators, designated $12_1$–$12_{10}$, each comparator receiving as separate inputs two bits (i,j) of comparison address B and two bits (i,j) of the current address A. The select signal SGEB is also applied as an input to each comparator $12_i$. The details of the implementation comparator 12 have been discussed above in association with FIG. 1. Once the current address A has passed through the 2-bit comparator level 12, all of the information vis-à-vis the value of each 2-bit section of A vs. B will have been determined. This information is sufficient to allow for a relatively simple gate logic structure to be used to ultimately determine the comparison between each full address.

As shown in FIG. 3, the remainder of the logic structure is formed from a plurality of comparator circuits 20, where comparator circuit 20 was described in detail above in association with FIG. 2. For an exemplary embodiment related to the processing of a 20-bit address, four stages of comparators are required; a first stage of comparator circuits are used to process four-bit segments of addresses A and B, a second stage of comparator circuits are used to process eight-bit segments of addresses A and B, a third stage for 16-bit segments, and a final stage to process the entire 20-bit length address signal. It is to be understood that any other suitable parsing may be used.

Referring to FIG. 3, a first comparator $20_1$ is used to compare the E, NE and GE outputs from comparators $12_1$ and $12_2$, as discussed above. Similarly, comparator $20_2$ receives as inputs the "E, NE and GE" signals from comparators $12_3$ (defined as the "LSB" unit of this 4-bit subsection) and $12_4$ (defined as the "MSB" unit of this 4-bit subsection), and so on, with comparator $20_5$ receiving as inputs the "E, NE and GE" signals generated by comparators $12_9$ (the LSB digits of this 4-bit subsection) and $12_{10}$ (the MSB digits of this subsection). In general, by comparing these E, NE and GE values for "contiguous" LSB/MSB bit sets, an exemplary comparator $20_i$ can determine if A=B or A≧B for the associated 4-digit stream. Simply put, the logic circuit is configured to provide the following output:

$E_{OUT} = \overline{NE_{MSB} + NE_{LSB}}$ $NE_{OUT} = \overline{E_{MSB} \cdot E_{LSB}}$ and $GE_{OUT} = GE_{MSB}$, if $E_{MSB} = 0$, $GE_{OUT} = GE_{LSB}$, if $E_{MSB} = 1$.

Once a first level comparison is performed by comparators $20_1$–$20_5$, a similar process can be used at the next stage, illustrated as comparators $20_6$ and $20_7$ in FIG. 3. At this stage, the results will provide output signals indicative of a comparison of 8-bit length segments of addresses A and B. Following the logic flow, the results from this 8-bit stage are applied as inputs to comparator $20_8$, which thus provides output signals indicative of a 16-bit length comparison of addresses A and B.

To perform the final comparison and ultimately determine whether current address A is greater-than-equal-to, or equal-to, comparison address B, the output from comparator $20_8$ is applied as an input to a comparator $20_9$, where the remaining input to comparator $20_9$ is the MSB output from comparator $20_5$. As with every other level of the comparison, if the value of the output signal "E" from $20_5$ is a logic "1" (meaning that the MSBs of addresses A and B are equal), then comparator $20_9$ will provide as the final output, denoted Z in FIG. 3, the GE value from comparator $20_8$. Otherwise, comparator $20_9$ will provide as the final output Z the GE value from comparator $20_5$.

Figure 4:
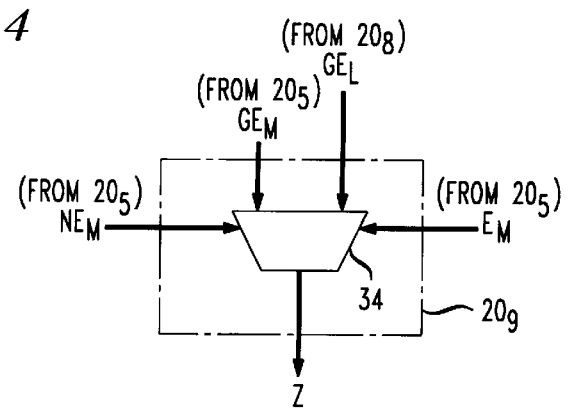
FIG. 4 contains a diagram of a simplified comparator useful as the final stage in the unsigned integer comparator of FIG. 3.

Since comparator $20_9$ is not required to form E and EN signals for subsequent stages, the circuit of comparator $20_9$ may be simplified. In particular, comparator $20_9$ need only comprise a comparator circuit similar to comparator 26 of FIG. 2; the NAND gate 22 and the NOR gate 24 can be eliminated. FIG. 4 illustrates an exemplary comparator $20_9$ that can be used for this purpose.

An alternative embodiment of the present invention may capitalize on this simplification of comparator $20_9$. In particular, since comparator $20_9$ only requires the inputs $GE_M$, $GE_L$, $NE_M$ and $E_M$ as shown in FIG. 4, a recursive simplification may be employed at each previous stage 20. In particular, comparator $20_8$ may be reduced to remove both its internal NAND gate and internal NOR gate. Therefore, the only inputs required to be applied to comparator $20_8$ are $GE_M$, $NE_M$ and $E_M$ from comparator $20_7$ and output $GE_L$ from comparator $20_6$. Following this simplification scheme, since the only output required from comparator $20_6$ is $GE_L$, the NAND gate and NOR gate used within comparator $20_6$ may likewise be eliminated. The remaining inputs to comparator $20_6$ are thus $GE_M$, $NE_M$ and $E_M$ from the previous stage comparator $20_2$ and the $GE_L$ output from comparator $20_1$. Lastly, therefore, comparator $20_1$ may be simplified to include only a comparator 26 and comparator $20_2$ may be simplified to include only a comparator 26 (to generate the required $GE_M$) and a NAND gate 22 (to generate the required $NE_M$). The trade-off between these above-described architectures is, in most respects, ease of design and manufacture (i.e., using exactly identical "building blocks" to form each comparator) vs. savings of space on the integrated circuit (i.e., removing a number of unnecessary NAND and NOR gates from the comparator structure). The delay through the comparator is unaffected by the design choice.

In yet another alternative embodiment of the present invention, the pair of two bit comparators $12_{10}$ and $12_9$ may be replaced by a set of four one bit comparators. The one bit comparator design requires only a pair of XOR gates and one NAND gate, thereby saving the size and complexity associated with an exemplary comparator 12, as shown in FIG. 2. Also, since these particular inputs are not required until the final stage of the comparison, additional processing will not delay the ultimate result.

It is to be understood that various other partitions may be used in the comparator arrangement of the present invention. For example, a twenty-bit address may be partitioned into 4-bit or 8-bit segments and evaluated to determine the "GE", "E" and NE" values as defined above to ascertain the value of a current address with respect to a known address. Lastly, the methodology as described may be used with unsigned integers of any length, the illustration using a pair of 20-bit addresses is considered to be exemplary only. The comparator as discussed above may be formed as an integrated circuit and included in, for example, a microprocessor, microcontroller or digital signal processor. The unsigned integer comparator is also useful in a hardware debugging unit that monitors bus signals.

What is claimed is:

1. An arrangement for comparing a first, currently received n-bit unsigned integer (A) to a second, known n-bit unsigned integer (B), the arrangement also utilizing as an input a select signal (SGEB) indicating whether the comparison is to be "equal to" or "greater than or equal to", the arrangement comprising a plurality of comparators, each comparator receiving as separate inputs an x-bit length segment from the received n-bit unsigned integer, an x-bit length segment from the known unsigned integer and the input select signal, the x-bit length segment from the known unsigned integer and the input select signal being combined to form a set of logic control signals that are multiplexed with the x-bit length segment of said received integer to generate a set of at least two output signals, a first output signal (GE) indicative of whether the x bits of said first signal are "equal-to" or "greater-than-equal-to" the x bits of said second signal, the indication of "equal" or "greater-than-equal" controlled by the value of said input select signal, and at least a second output signal chosen from the group consisting of: (a) an "equal" signal (E) indicative of whether the x bits of said first signal are equal to the x bits of said second signal and (b) a "not equal" signal (NE) indicative of whether the x bits of said first signal are not equal to the x bits of said second signal;

a plurality of logic modules responsive to the sets of outputs generated by the plurality of x-bit comparators, each logic module receiving as inputs the output signals from a pair of contiguous comparators, a first comparator of said pair of contiguous comparators defined as the "least significant bits" (LSB) comparator and providing as inputs to the associated logic module inputs designated $GE_L$ and $E_L$ and/or $NE_L$, and a second, remaining comparator of said pair of contiguous comparators defined as the "most significant bits" (MSB) comparator and providing as inputs to the associated logic module inputs designated $GE_M$ and $E_M$ and/or $NE_M$, said logic module generating a set of at least two outputs $GE_{OUT}$ and $E_{OUT}/NE_{OUT}$ as follows:

$E_{OUT} = \overline{NE_M + NE_L}$ $NE_{OUT} = \overline{E_M \cdot E_L}$ $GE_{OUT} = GE_M$, if $E_M = 1$; $= GE_L$, if $E_M = 0$.

2. An unsigned integer comparator as defined in claim 1, wherein the comparator further comprises a second plurality of logic modules, responsive to the set of outputs generated by a pair of contiguous logic modules of the first plurality of logic modules, said second plurality of logic modules for sequentially processing the sets of outputs in pairs until a single, final "GE" output is generated, where the final "GE" signal is indicative of whether the received n-bit unsigned integer (A) is greater than/equal to or equal to the known n-bit unsigned integer (B).

3. An unsigned integer comparator as defined in claim 2 wherein at least one logic module of the first and second pluralities of logic modules comprises a comparator for receiving as separate logic inputs the pair of signals $GE_L$ and $GE_M$ and receiving as a control input either the $NE_M$ output, said comparator generating a GE output signal based on the following:

$GE_{OUT} = GE_M$, if $NE_M = 0$;

$GE_{OUT} = GE_L$, if $NE_M = 1$; and a module receiving as separate inputs the $NE_M$ and $NE_L$ outputs and providing as an output the E signal based on the following:

$E_{OUT} = \overline{NE_M + NE_L}$.

4. An unsigned integer comparator as defined in claim 2 wherein at least one logic module of the first and second pluralities of logic modules comprises a comparator for receiving as separate logic inputs the pair of signals $GE_L$ and $GE_M$ and receiving as a control input either the $E_M$ output, said comparator generating a GE output signal based on the following:

$GE_{OUT} = GE_M$, if $E_M = 1$;

$GE_{OUT} = GE_L$ if $E_M = 0$; and a module, receiving as separate inputs the $E_M$ and $E_L$ outputs and providing as an output the NE signal based on the following:

$NE_{OUT} = \overline{E_M \cdot E_L}$.

5. An unsigned integer comparator as defined in claim 2 wherein at least one logic module of the first and second pluralities of logic modules comprises a comparator for receiving as separate logic inputs the pair of signals $GE_L$ and $GE_M$ and receiving as a control input the $NE_M$ output, said comparator generating a GE output signal based on the following:

$GE_{OUT} = GE_M$, if $NE_M = 0$;

$GE_{OUT} = GE_L$ if $NE_M = 1$.

6. An unsigned integer comparator as defined in claim 1 wherein the set of output signals from each comparator comprises a pair of output signals consisting of the first output signal GE and the "equal" output signal E.

7. An unsigned integer comparator as defined in claim 1 wherein the set of output signals from each comparator comprises a pair of output signals consisting of the first output signal GE and the "not equal" output signal NE.

8. An unsigned integer comparator as defined in claim 1 wherein the set of output signals comprises a set of three output signals consisting of the first output signal GE, the "equal" output signal E and the "not equal" output signal NE.

9. An unsigned integer as defined in claim 1 wherein a plurality of 2-bit comparators are used.

10. A method of comparing two n-bit unsigned integers, a first known integer (B) and a second, received integer (A), the comparison for determining if A≧B or A=B, the operands ≧ and = under the control of a pre-defined selection signal (SGEB), the method comprising the steps of:

a) parsing the first, known signal into x-bit segments;

b) forming, for each x-bit segment parsed in step a), a plurality of control signals based upon a set of predetermined logic combinations of said x-bit segment with the selection signal;

c) for each x-bit segment parsed in step a), applying the plurality of control signals formed in step b) as control signal inputs to a multiplexer;

wherein as each second signal is received, the following steps are performed:

d) parsing the n-bit received signal into x-bit segments;

e) for each x-bit segment parsed in step d), multiplexing with the associated control signals of step c) and generating a set of output signals including a first signal "GE" indicative of whether the x bits of said received signal are "greater-than-equal-to" or "equal-to" the x bits of said known signal, the indication of "greater-than-equal-to" or "equal-to" controlled by the value of said pre-defined selection signal and at least a second signal chosen from the following pair of possible output signals: (a) an "equal" signal "E" indicative of whether the x bits of said received signal are equal to the x bits of said known signal and (b) a "not equal" signal "NE" indicative of whether the x bits of said received signal are not equal to the x bits of said known signal;

f) multiplexing, in pairs, the output signals generated in step e) to form a set of output signals indicative of a comparison of a 2x bit length segment of said received address and said known address, the output signals including a first signal "GE" indicative of whether the 2x bits of said received signal are "greater-than-equal-to" or "equal-to" the 2x bits of said known signal and at least a second signal chosen from the following pair of possible output signals: (a) an "equal" signal "E" indicative of whether the x bits of said received signal are equal to the 2x bits of said known signal and (b) a "not equal" signal "NE" indicative of whether the x bits of said received signal are not equal to the 2x bits of said known signal; and g) continuing the multiplexing process of step f) for larger segments of said received address and said known address until the entire n-length addresses have been compared.

11. The method as defined in claim 10 wherein in performing steps d) and f) the signals "GE" and "E" are generated.

12. The method as defined in claim 10 wherein in performing steps d) and f), the signals "GE" and "NE" are generated.

13. The method as defined in claim 10 wherein in performing steps d) and f), the signals "GE", "E" and "NE" are generated.

14. The method as defined in claim 10 wherein in performing steps a) and d), the addresses are parsed into two-bit length segments.

15. A hardware debugging unit comprising an arrangement for comparing a first, currently received n-bit unsigned integer (A) to a second, known n-bit unsigned integer (B), the arrangement also utilizing as an input a select signal (SGEB) indicating whether the comparison is to be "equal to" or "greater than or equal to", the arrangement including a plurality of comparators, each comparator receiving as separate inputs an x-bit length segment from the received n-bit unsigned integer, an x-bit length segment from the known unsigned integer and the input select signal, the x-bit length segment from the known unsigned integer and the input select signal being combined to form a set of logic control signals that are multiplexed with the x-bit length segment of said received integer to generate a set of at least two output signals, a first output signal (GE) indicative of whether the x bits of said first signal are "equal-to" or "greater-than-equal-to" the x bits of said second signal, the indication of "equal" or "greater-than-equal" controlled by the value of said input select signal and at least a second output signal chosen from the group consisting of: (a) an "equal" signal (E) indicative of whether the x bits of said first signal are equal to the x bits of said second signal and (b) a "not equal" signal (NE) indicative of whether the x bits of said first signal are not equal to the x bits of said second signal;

a plurality of logic modules responsive to the sets of outputs generated by the plurality of x-bit comparators, each logic module receiving as inputs the output signals from a pair of contiguous comparators, a first comparator of said pair of contiguous comparators defined as the "least significant bits" (LSB) comparator and providing as inputs to the associated logic module inputs designated $GE_L$ and $E_L$ and/or $NE_L$, and a second, remaining comparator of said pair of contiguous comparators defined as the "most significant bits" (MSB) comparator and providing as inputs to the associated logic module inputs designated $GE_M$ and $E_M$ and/or $NE_M$, said logic module generating a set of at least two outputs $GE_{OUT}$ and $E_{OUT}/NE_{OUT}$ as follows:

$E_{OUT} = \overline{NE_M + NE_L}$ $NE_{OUT} = \overline{E_M \cdot E_L}$ $GE_{OUT} = GE_M$, if $E_M = 1$; $= GE_L$, if $E_M = 0$.

16. An integrated circuit comprising an arrangement for comparing a first, currently received n-bit unsigned integer (A) to a second, known n-bit unsigned integer (B), the arrangement also utilizing as an input a select signal (SGEB) indicating whether the comparison is to be "equal to" or "greater than or equal to", the arrangement comprising a plurality of comparators, each comparator receiving as separate inputs an x-bit length segment from the received n-bit unsigned integer, an x-bit length segment from the known unsigned integer and the input select signal, the x-bit length segment from the known unsigned integer and the input select signal being combined to form a set of logic control signals that are multiplexed with the x-bit length segment of said received integer to generate a set of at least two output signals, a first output signal (GE) indicative of whether the x bits of said first signal are equal to or greater than/equal to the x bits of said second signal, the indication of "equal-to" or "greater-than-equal-to" controlled by the value of said input select signal and at least a second output signal chosen from the group consisting of: (a) an "equal" signal (E) indicative of whether the x bits of said first signal are equal to the x bits of said second signal and (b) a "not equal" signal (NE) indicative of whether the x bits of said first signal are not equal to the x bits of said second signal;

a plurality of logic modules responsive to the outputs generated by the plurality of x-bit comparators, each logic module receiving as inputs the set of three output signals from a pair of contiguous comparators, a first comparator of said pair of contiguous comparators defined as the "least significant bits" (LSB) comparator and providing as inputs to the associated logic module inputs designated $GE_L$ and $E_L$ and/or $NE_L$, and a second, remaining comparator of said pair of contiguous comparators defined as the "most significant bits" (MSB) comparator and providing as inputs to the associated logic module inputs designated $GE_M$ and $E_M$ and/or $NE_M$, said logic module generating a set of at least two outputs $GE_{OUT}$ and $E_{OUT}/NE_{OUT}$ as follows:

$E_{OUT} = \overline{NE_M + NE_L}$ $NE_{OUT} = \overline{E_M \cdot E_L}$ $GE_{OUT} = GE_M$, if $E_M = 1$; $= GE_L$, if $E_M = 0$.

17. An integrated circuit as defined in claim 16 wherein the integrated circuit comprises a microprocessor.

18. An integrated circuit as defined in claim 16 wherein the integrated circuit comprises a microcontroller.

19. An integrated circuit as defined in claim 16 wherein the integrated circuit comprises a digital signal processor.

* * * * *